US012671130B2

(12) United States Patent (10) Patent No.: US 12,671,130 B2
Komazaki et al. (45) Date of Patent: Jun. 30, 2026

(54) POWER GENERATION METHOD AND POWER GENERATING ELEMENT USING HUMIDITY VARIATION

(71) Applicant: National Institute of Advanced Industrial Science and Technology, Tokyo (JP)

(72) Inventors: Yusuke Komazaki, Tsukuba (JP); Kenji Kanazawa, Tsukuba (JP); Taiki Nobeshima, Tsukuba (JP); Hirotada Hirama, Tsukuba (JP); Yuichi Watanabe, Tsukuba (JP); Sei Uemura, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 517 days.

(21) Appl. No.: 18/268,903

(22) PCT Filed: Oct. 13, 2021

(86) PCT No.: PCT/JP2021/037960
§ 371 (c)(1),
(2) Date: Jun. 21, 2023

(87) PCT Pub. No.: WO2022/137749
PCT Pub. Date: Jun. 30, 2022

(65) Prior Publication Data
US 2024/0079687 A1 Mar. 7, 2024

(30) Foreign Application Priority Data
Dec. 22, 2020 (JP) ................................. 2020-212853

(51) Int. Cl.
*H01M 12/02* (2006.01)
*H01M 4/06* (2006.01)
(Continued)

(52) U.S. Cl.
CPC ............. *H01M 12/02* (2013.01); *H01M 4/06* (2013.01); *H01M 4/582* (2013.01); *H01M 12/065* (2013.01)

(58) Field of Classification Search
CPC ........ H01M 12/02; H01M 4/06; H01M 4/582; H01M 12/065
(Continued)

(56) References Cited

U.S. PATENT DOCUMENTS

2013/0280579 A1 10/2013 Wright et al.
2014/0059820 A1 3/2014 Wright et al.
(Continued)

FOREIGN PATENT DOCUMENTS

JP H11-317247 A 11/1999
JP 2003217643 A * 7/2003 .............. H01M 8/04
(Continued)

OTHER PUBLICATIONS

Komazaki et al., "Energy harvesting by ambient humidity variation with continuous milliampere current output and energy storage"; Royal Society of Chemistry; Sustainable Energy & Fuels, Issue 14, pp. 3570-3577; Jun. 2, 2021 (8 pages).
(Continued)

*Primary Examiner* — Patricia L. Hailey
(74) *Attorney, Agent, or Firm* — Osha Bergman Watanabe & Burton LLP

(57) ABSTRACT

Provided are a power generation method and a power generating element capable of obtaining an electromotive force by utilizing humidity variation in an environment and having excellent operation stability. An aqueous solution of an ionic compound having deliquescence is separated by an ion permeable membrane, electrodes are inserted into the aqueous solution on both sides of the ion permeable membrane, one is blocked from outside air and sealed, and the
(Continued)

13 other is connected to the outside air, and a difference in ion concentration derived from the ionic compound in the aqueous solution is generated across the ion permeable membrane due to a change in humidity in the outside air to generate an electromotive force between the electrodes.

11 Claims, 7 Drawing Sheets

(51) Int. Cl.
*H01M 4/58* (2010.01)
*H01M 12/06* (2006.01)

(58) Field of Classification Search
USPC .... 429/405, 498, 499; 210/689, 690, 748.01
See application file for complete search history.

(56) References Cited

U.S. PATENT DOCUMENTS

| | | |
|---|---|---|
| 2014/0349211 A1 | 11/2014 | Wei et al. |
| 2016/0344062 A1 | 11/2016 | Wright et al. |
| 2018/0226680 A1 | 8/2018 | Wright et al. |
| 2019/0288334 A1 | 9/2019 | Wright et al. |
| 2021/0091411 A1 | 3/2021 | Wright et al. |
| 2021/0249717 A1 | 8/2021 | Johnson |
| 2024/0396122 A1* | 11/2024 | Tanabe ..................... B60N 2/16 |

FOREIGN PATENT DOCUMENTS

| | | | | |
|---|---|---|---|---|
| JP | 2017152181 A | * | 8/2017 | .............. H01M 8/02 |
| JP | 2018-049833 A | | 3/2018 | |
| WO | 2021163293 A1 | | 8/2021 | |
| WO | WO-2023047749 A1 | * | 3/2023 | .......... H01M 50/489 |
| WO | WO-2024253185 A1 | * | 12/2024 | ............ H01M 14/00 |

OTHER PUBLICATIONS

International Preliminary Report on Patentability and Written Opinion issued in corresponding International Application No. PCT/JP2021/037960, issued Jul. 6, 2023 (5 pages).

Extended European Search Report issued in corresponding European Patent Application No. 21909907.4, dated Jun. 23, 2025 (6 pages).

Han et al., "A hygroelectric power generator with energy self-storage", Chemical Engineering Journal, vol. 384, pp. 1-5, Nov. 4, 2019 (5 pages).

Xu et al., "Generating Electricity from Water through Carbon Nanomaterials", Chemistry—A European Journal, vol. 24, pp. 6287-6294, Feb. 27, 2018 (8 pages).

Office Action issued in related Korean Application No. 10-2023-7019851 mailed Oct. 16, 2025 (13 pages).

Zhiling Luo et. al., "A moisture induced self-charging device for energy harvesting and storage"; Nano Energy 60, pp. 371-376, Mar. 25, 2019 (6 pages).

* cited by examiner (a)

(b)

POWER GENERATION METHOD AND POWER GENERATING ELEMENT USING HUMIDITY VARIATION

CROSS-REFERENCE TO RELATED APPLICATION

The present application is based on and claims priority to Japanese Patent Application No. 2020-212853, filed on Dec. 22, 2020, and PCT Application No. PCT/JP2021/037960, filed on Oct. 13, 2021, the disclosure of which is hereby incorporated by reference in their entirety.

TECHNICAL FIELD

The present invention relates to a power generation method and a power generating element for obtaining an electromotive force using humidity variation in the environment, and more particularly to a power generation method and a power generating element using humidity variation using a deliquescent material.

BACKGROUND ART

With the spread of the IoT technology, an enormous number of small sensors and electronic devices are installed everywhere. As a drive source of these small sensors and the like, it is not realistic to wire electric wires from a power source or individually incorporate large batteries that need to be replaced. Therefore, it has been required to use a micro-battery as a primary battery that can obtain a stable operation over a long period of time.

For example, Patent Literature 1 discloses a microbattery using an ionic liquid gel electrolyte that can be directly integrated on the same substrate as a device that supplies power. A structure is employed in which an ionic liquid electrolyte is swollen in a polymer at room temperature to form a non-aqueous gel, replacing conventional alkaline and acidic liquid electrolytes (and separators) of zinc-metal oxide batteries. It is assumed that such a cell can stably obtain power of about 1.5 V and 5 mAh per cell.

Many power generation methods have been proposed that convert energy existing in the environment such as vibration, electromagnetic waves and the like into electric power, including optical-to-electrical conversion elements such as solar cells (solar panels) and thermoelectric elements that convert heat into electricity. These are also referred to as environmental power generation, energy harvesting, and the like. It is also considered that a power generation device using such a power generation method is used as a drive source of the IoT sensor or the like described above.

CITATION LIST

Patent Literature

Patent Literature 1: JP 2018-49833 A

SUMMARY OF INVENTION

Technical Problem

Regarding the environmental power generation, for example, in the case of a solar cell, it is pointed out that there is a problem that the solar cell has lacked stability such as an intermittent operation or the like due to a great influence of environmental change on the operation of the cell depending on the environmental energy source, such as the fact that the operation is easily affected by the weather. On the other hand, if it is possible to convert a change in humidity in the air into an electromotive force, a certain degree of change is continuously caused throughout the day, and thus it is considered that certain stability as a primary battery can be obtained.

The present invention has been made in view of the situation as described above, and an object of the present invention is to provide a power generation method and a power generating element that can obtain an electromotive force using humidity variation in the environment and have excellent operation stability.

Solution to Problem

The power generation method according to the present invention is a power generation method for obtaining an electromotive force using humidity variation in an environment, wherein an aqueous solution of an ionic compound having deliquescence is separated by an ion permeable membrane, electrodes are inserted into the aqueous solution on both sides of the ion permeable membrane, one is blocked from outside air and sealed, and the other is connected to the outside air, and a difference in ion concentration derived from the ionic compound in the aqueous solution is generated across the ion permeable membrane due to a change in humidity in the outside air to generate an electromotive force between the electrodes.

Further, the power generating element according to the present invention is a power generating element for obtaining an electromotive force using humidity variation in an environment, having an ion permeable membrane that separates an aqueous solution of an ionic compound having deliquescence, and electrodes inserted into the aqueous solution on both sides of the ion permeable membrane, wherein one of the aqueous solutions separated by the ion permeable membrane is blocked from outside air and sealed, and the other is connected to the outside air, and a difference in ion concentration derived from the ionic compound in the aqueous solution is generated across the ion permeable membrane due to a change in humidity in the outside air to generate an electromotive force between the electrodes.

In the above-described invention, an electromotive force can be obtained using the humidity variation in the environment with a large daily variation, and the operation stability is excellent. Moreover, since humidity variation occur anywhere in the environment, it does not depend on the installation location and is also excellent in convenience.

DESCRIPTION OF EMBODIMENTS

Example 1

Hereinafter, a power generating element which is one example of the present invention will be described with reference to FIG. 1.

Figure 1:
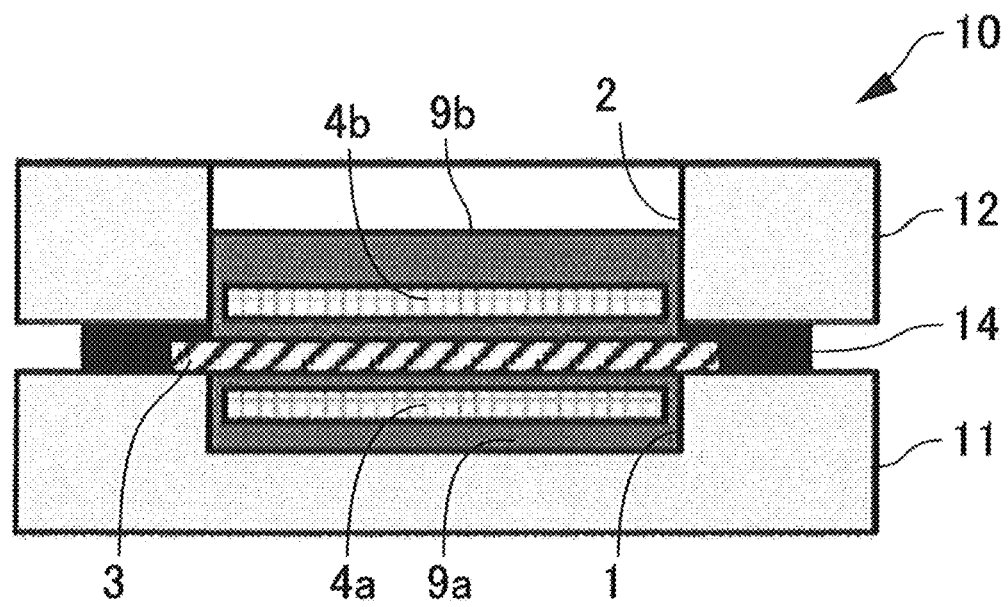
FIG. 1 is a cross-sectional view of a power generating element according to the present invention.

As illustrated in FIG. 1, a power generating element 10 includes a closed tank 1 and an open tank 2 storing an aqueous solution 9a and an aqueous solution 9b, respectively. The closed tank 1 and the open tank 2 are separated from each other by an ion permeable membrane 3. An electrode 4a and an electrode 4b are inserted into the closed tank 1 and the open tank 2 so as to be in contact with the aqueous solutions 9a and 9b, respectively. In addition, the closed tank 1 is sealed off from an outside air, and the open tank 2 communicates with the outside air to connect the stored aqueous solution to the outside air. The electrode 4a and the electrode 4b are connected to wiring or the like for extracting an electromotive force generated therebetween to the outside.

The aqueous solution 9a and the aqueous solution 9b are aqueous solutions of an ionic compound having deliquescence. Therefore, by being connected to an outside air in the open tank 2, moisture is absorbed or discharged by humidity change in the outside air to change the ion concentration of the aqueous solution 9b. As the ionic compound having deliquescence, for example, halides such as chlorides, bromides and the like can be suitably used. Since the open tank 2 only needs to be able to exchange moisture with the outside, a lid made of a membrane or the like that transmits water vapor and does not transmit the aqueous solution 9b may be provided. The outflow of the aqueous solution 9b in the open tank 2 to the outside can be suppressed, thus, the power generating element 10 can be easily handled.

Here, a plate body 11 having a recess for forming the closed tank 1, the ion permeable membrane 3, and a plate body 12 having a hole for forming the open tank 2 are sequentially stacked, and the outer periphery of the ion permeable membrane 3 is fixed to the plate body 11 and the plate body 12 while the plate body 11 and the plate body 12 are sealed with a packing 14 to form a cell for obtaining the power generating element 10.

Figure 2:
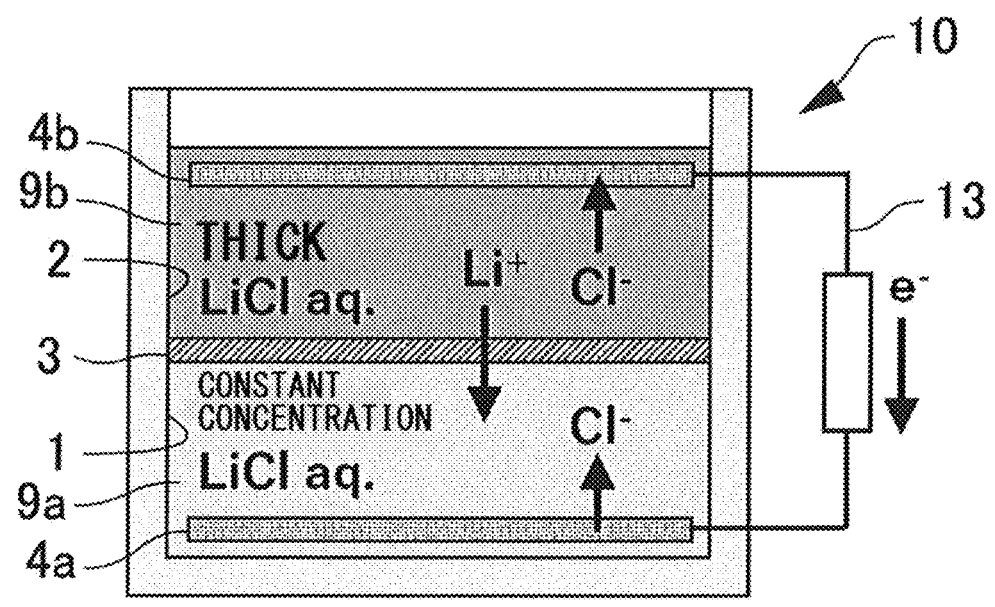
FIG. 2 is a cross-sectional view of a power generating element according to the present invention.

Next, a power generation method using the power generating element 10 will be described with reference to FIG. 2. Here, a case where a lithium chloride aqueous solution is used as the aqueous solutions 9a and 9b, a silver-silver chloride electrode is used as the electrodes 4a and 4b, and a cation exchange membrane is used as the ion permeable membrane 3 will be described.

When the humidity of the outside air of the power generating element 10 is low, the aqueous solution 9b in the open tank 2 evaporates moisture to increase the concentration of lithium chloride as a solute. On the other hand, in the closed tank 1, moisture does not flow in and out, and thus the concentration of the aqueous solution does not change. As a result, the aqueous solution 9b in the open tank 2 is thicker than the aqueous solution 9a in the closed tank 1. At this time, the concentration of Lit which is a cation in the aqueous solution 9b is also higher than that in the aqueous solution 9a, and a difference in concentration of Li$^+$ is generated across the ion permeable membrane 3. With such an ion concentration difference as a driving force, Li$^+$ permeates through the ion permeable membrane 3 toward the aqueous solution 9a of the closed tank 1.

In the open tank 2, Cl$^-$ as an anion in the aqueous solution 9b is excessive as compared with Li$^+$ as a cation, and reacts with silver in the electrode 4b to generate silver chloride and electrons as shown in the following chemical reaction formula (Formula 1) in order to obtain equilibrium.

$$Ag + Cl^- \rightarrow AgCl + e^- \qquad \text{(Formula 1)}$$

On the other hand, in the closed tank 1, the amount of Cl is smaller than that of Li$^+$, and silver chloride in the electrode 4a is decomposed using electrons to generate silver and Cl$^-$ as shown in the following chemical reaction formula (Formula 2) in order to obtain equilibrium.

$$AgCl + e^- \rightarrow Ag + Cl^- \qquad \text{(Formula 2)}$$

In this case, electrons obtained by (Formula 1) flow through the circuit 13 from the electrode 4b in the open tank 2 toward the electrode 4a in the closed tank 1. In other words, a current flows from the electrode 4a toward the electrode 4b. That is, an electromotive force can be generated between the electrodes composed of the electrode 4a and the electrode 4b.

On the other hand, when the humidity of the outside air of the power generating element 10 is high, the aqueous solution 9b in the open tank 2 absorbs moisture by its deliquescence, and the concentration of lithium chloride as a solute is lowered. On the other hand, in the closed tank 1, moisture does not flow in and out, and thus the concentration of the aqueous solution 9a does not change. As a result, the aqueous solution 9b in the open tank 2 is thinner than the aqueous solution 9a in the closed tank 1. At this time, the concentration of Li$^+$ which is a cation of the aqueous solution 9b is also lower than that in the aqueous solution 9a, and Li$^+$ permeates through the ion permeable membrane 3 toward the aqueous solution 9b of the open tank 2 so as to balance this.

Then, contrary to the above, the reaction of (Formula 1) occurs in the closed tank 1, and the reaction of (Formula 2) occurs in the open tank 2. That is, the reaction proceeds in the opposite direction to the above, and an electromotive force in the opposite direction can be obtained.

As described above, according to the power generating element 10, it is possible to generate a concentration difference in ions derived from the ionic compound in the aqueous solution between the closed tank 1 and the open tank 2 due to humidity variation in an outside air, and thus to generate an electromotive force between the electrodes. In particular, it is possible to generate an electromotive force by reversing the direction of the chemical reaction between when the humidity in an outside air increases and when the humidity decreases. Since an electromotive force can be obtained by repeating such a reversible reaction, operation stability is excellent by utilizing humidity variation in an environment with large daily variation. In addition, since the humidity variation occurs anywhere in the environment, it does not depend on the installation place of the power generating element 10 and convenience is also excellent. Since there is no reactant lost from the power generating element 10, an electromotive force can be obtained theoretically by a reaction having complete reversibility.

When a chloride is used as the ionic compound to be dissolved in the aqueous solution as in (Formula 1) and (Formula 2), the chloride is also contained in the electrode, so that the above-described reversible reaction can be obtained. That is, the ionic compound used in the aqueous solution and the material of the electrode constitute a combination containing a compound based on the same ion.

In addition, as the power generating element, a power generating element having a small internal resistance is preferable, and for example, the internal resistance is preferably 10 ohms or less. According to the combination of the lithium chloride aqueous solution and the silver-silver chloride electrode, the internal resistance can be set to about several ohms.

Example 2

Next, a vertical power generating element which is another example will be described with reference to FIG. 3.

Figure 3:
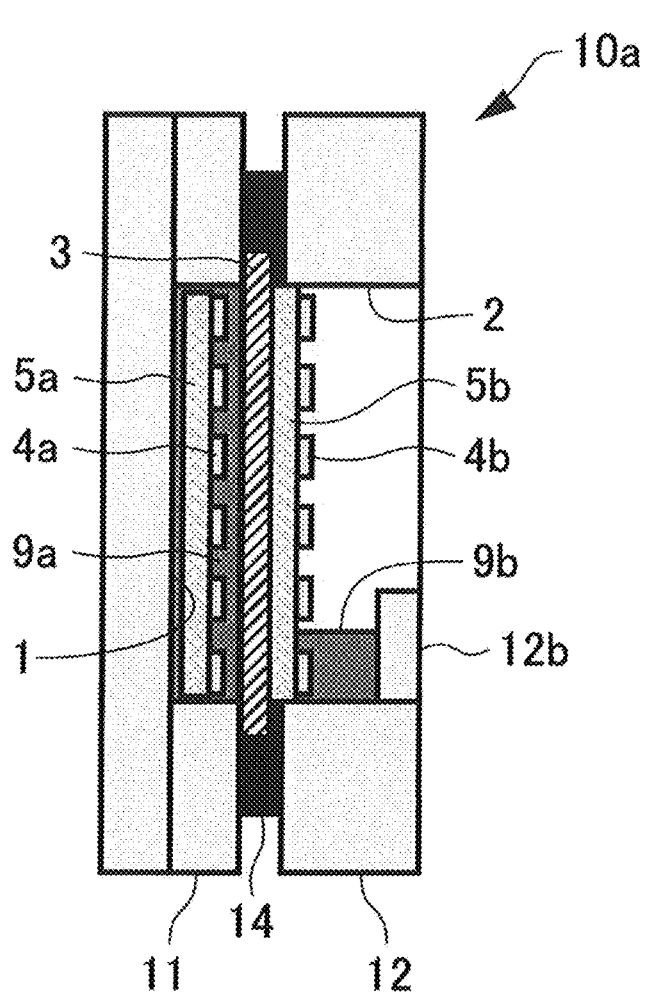
FIG. 3 is a cross-sectional view of another power generating element according to the present invention.

As illustrated in FIG. 3, in the power generating element 10a, similarly to the power generating element 10 described above, also in the power generating element 10a, a plate body 11 having a recess for forming the closed tank 1, the ion permeable membrane 3, and a plate body 12 having a hole for forming the open tank 2 are stacked, and the outer periphery of the ion permeable membrane 3 is fixed to the plate body 11 and the plate body 12 while the plate body 11 and the plate body 12 are sealed with a packing 14. Here, in the plate body 12 forming the open tank 2, a wall portion 12b is provided so as to cover a part of the lower side of the opening of the hole, and the stored aqueous solution 9b can be held in the open tank 2 also as a vertical type. Further, the electrode 4b is integrally provided on the plate-shaped main surface of the porous body 5b that can be permeated with the aqueous solution 9b and can hold the aqueous solution. The porous body 5b extends from the lower end to the upper end in the open tank 2, and can allow the aqueous solution 9b to permeate to the upper end and can hold the aqueous solution. Therefore, the electrode 4b can be reliably in contact with the aqueous solution 9b on the porous body 5b. Similarly, in the closed tank 1, the electrode 4a is integrally provided on the main surface of the porous body 5a to ensure liquid contact of the electrode 4a. Here, filter paper was used as the porous body 5b, and an electrode was formed and integrated by printing on the filter paper.

According to the power generating element 10a, even in the vertical arrangement, the porous body 5a and the porous body 5b can reliably obtain a liquid contact of the electrode 4a and the electrode 4b, to obtain an electromotive force. As a result, even if the aqueous solution 9b that flows downward by gravity is held in the open tank 2, the degree of freedom in arrangement of the power generating element 10a can be relatively high.

Example 3

As still another example, a three-chamber type power generating element will be described with reference to FIGS. 4 and 5.

Figure 4:
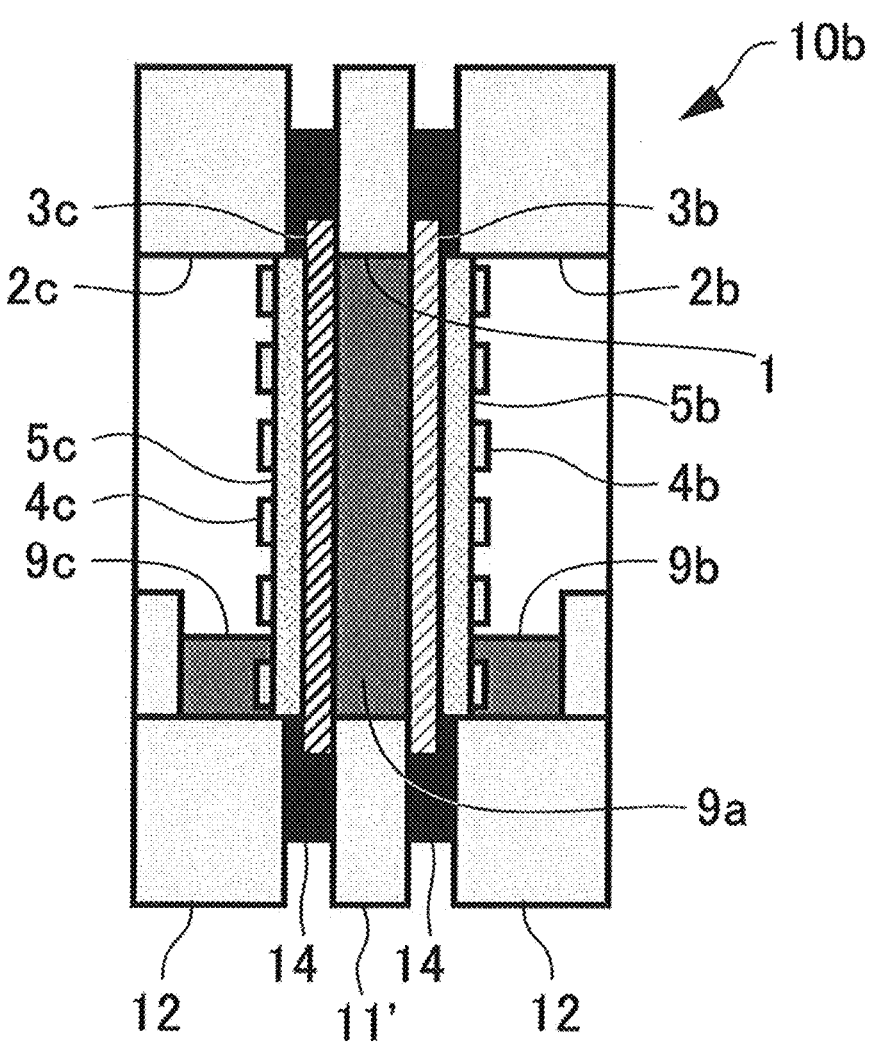
FIG. 4 is a cross-sectional view of still another power generating element according to the present invention.

As illustrated in FIG. 4, in the power generating element 10b, two open tanks 2b and 2c are disposed so as to sandwich a closed tank 1, and an anion exchange membrane 3b and a cation exchange membrane 3c are disposed as ion permeable membranes between the closed tank 1 and the open tanks 2b and 2c, respectively. That is, the closed tank 1 is formed by a hole provided in a plate body 11', and open tanks 2b and 2c are formed by holes provided in two plate bodies 12 arranged so as to sandwich the plate body 11' via the anion exchange membrane 3b and the cation exchange membrane 3c. In the open tank 2b and the open tank 2c, a plate-shaped porous body 5b and a plate-shaped porous body 5c are disposed so as to extend from the lower end to the upper end, and an aqueous solution 9b and an aqueous solution 9c permeate therethrough, respectively. On the porous body 5b and the porous body 5c, an electrode 4b and an electrode 4c are integrally formed, to secure liquid contact of the electrode 4b and the electrode 4c, respectively.

Furthermore, a power generation method using the power generating element 10b will be described with reference to FIGS. 5 and 6. Here, a case where a lithium chloride aqueous solution is used as aqueous solutions 9a, 9b, and 9c, and a silver-silver chloride electrode is used as electrodes 4b and 4c will be described.

Figure 5:
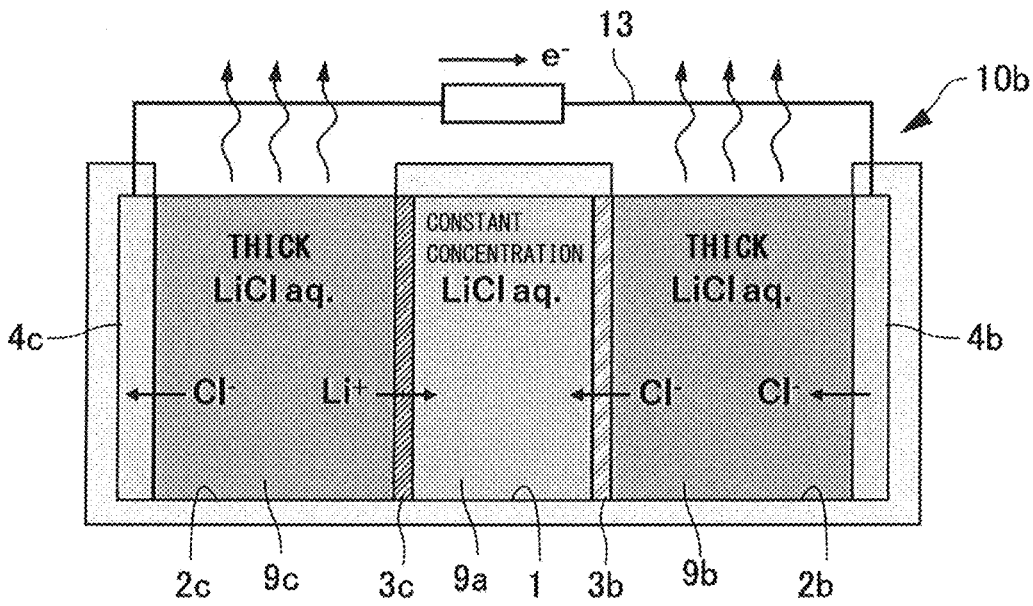
FIG. 5 is a cross-sectional view of still another power generating element according to the present invention.

As illustrated in FIG. 5, when the humidity of an air outside the power generating element 10b is lowered, an aqueous solution 9b and an aqueous solution 9c in an open tank 2b and an open tank 2c evaporate moisture to increase the concentration of lithium chloride as a solute. On the other hand, in the closed tank 1, moisture does not flow in and out, and thus the concentration of the aqueous solution does not change. As a result, the aqueous solutions 9b and 9c in the open tank 2b and the open tank 2c are thicker than the aqueous solution 9a in the closed tank 1. At this time, the concentration of $Li^+$, which is a cation, and the concentration of $Cl^-$, which is an anion, in the aqueous solution 9b and the aqueous solution 9c are also higher than those in the aqueous solution 9a, and a difference in concentration of $Li^+$ and $Cl^-$ occurs across the anion exchange membrane 3b and the cation exchange membrane 3c. With such an ion concentration difference as a driving force, $Cl^-$ permeates through the anion exchange membrane 3b from the open tank 2b toward the aqueous solution 9a in the closed tank 1, and $Li^+$ permeates through the cation exchange membrane 3c from the open tank 2c toward the aqueous solution 9a in the closed tank 1.

In the open tank 2b, $Li^+$ as a cation in the aqueous solution 9b is excessive as compared with $Cl^-$ as an anion, and silver chloride in the electrode 4b is decomposed to generate silver and $Cl^-$ as shown in the chemical reaction formula (Formula 2) described above in order to obtain equilibrium.

On the other hand, in the open tank 2c, $Cl^-$ as an anion in the aqueous solution 9c is excessive as compared with $Li^+$ as a cation, and reacts with silver in the electrode 4c to generate silver chloride and electrons as shown in the chemical reaction formula (Formula 1) described above in order to obtain equilibrium.

In this case, electrons obtained by (Formula 1) flow through the circuit 13 from the electrode 4c in the open tank 2c toward the electrode 4b in the open tank 2b. In other words, a current flows from the electrode 4b toward the electrode 4c. That is, an electromotive force can be generated between the electrodes composed of the electrode 4b and the electrode 4c.

Figure 6:
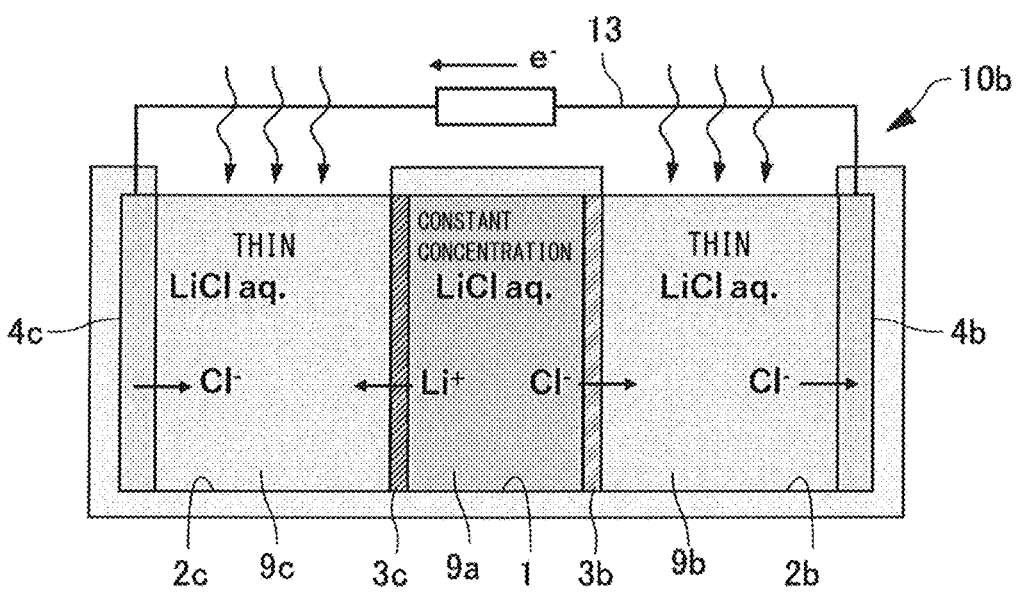
FIG. 6 is a cross-sectional view of still another power generating element according to the present invention.

On the other hand, as shown in FIG. 6, when the humidity of an air outside the power generating element 10b is made higher, the aqueous solutions 9b and 9c in the open tank 2b and the open tank 2c absorb moisture by their deliquescence, and the concentration of lithium chloride as a solute is lowered. On the other hand, in the closed tank 1, moisture does not flow in and out, and thus the concentration of the aqueous solution 9a does not change. As a result, the aqueous solution 9b and the aqueous solution 9c in the open tank 2b and the open tank 2c are thinner than the aqueous solution 9a in the closed tank 1. At this time, the concentration of Lit, which is a cation, and the concentration of Cl⁻, which is an anion, in the aqueous solution 9b and the aqueous solution 9c are also lower than those in the aqueous solution 9a, and Cl⁻ permeates the anion exchange membrane 3b from the aqueous solution 9a in the closed tank 1 toward the aqueous solution 9b in the open tank 2b, and Li⁺ permeates the cation exchange membrane 3c toward the aqueous solution 9c in the open tank 2c, so as to balance this.

Then, contrary to the above, the reaction of (Formula 1) occurs in the open tank 2b, and the reaction of (Formula 2) occurs in the open tank 2c. That is, the reaction proceeds in the opposite direction to the above, and an electromotive force in the opposite direction can be obtained.

As described above, also by the three-chamber type power generating element 10b, it is possible to generate a concentration difference in ions derived from the ionic compound in the aqueous solution between the closed tank 1 and the open tank 2b and the open tank 2c due to humidity variation in an outside air, and thus to generate an electromotive force between the electrode 4b and the electrode 4c. In addition, it is possible to generate an electromotive force by reversing the direction of the chemical reaction between when the humidity in an outside air increases and when the humidity decreases.

[Production Test]

A description will be made on results of actually producing the power generating element as described above and examining the performance thereof, referring to FIGS. 7 and 8.

Here, a two-chamber type power generating element such as the power generating element 10 and the power generating element 10a and a three-chamber type power generating element such as the power generating element 10b were produced, and a test in which a combination of an aqueous solution and an ion permeable membrane was changed was performed. As the aqueous solution, a lithium chloride aqueous solution or a calcium chloride aqueous solution was used. The concentration of the lithium chloride aqueous solution was adjusted to 20%, and 0.75 mL of the lithium chloride aqueous solution was stored in each of a closed tank and an open tank. The concentration of the calcium chloride aqueous solution was adjusted to 30%, and 0.75 mL of the calcium chloride aqueous solution was stored in each of a closed tank and an open tank. In the two-chamber type power generating element, Neosepta CSE (registered trademark, manufactured by ASTOM Corporation) or Nafion 117 (registered trademark, manufactured by Sigma-Aldrich) was used as a cation exchange membrane. In the three-chamber type power generating element, the same cation exchange membrane as described above was used, and Neosepta ASE (registered trademark, manufactured by ASTOM Corporation) was used as an anion exchange membrane. As an electrode, a silver-silver chloride electrode was used. The electrode was prepared by printing a silver paste in a mesh shape on filter paper and then performing anodic oxidation in a lithium chloride aqueous solution.

Figure 7:
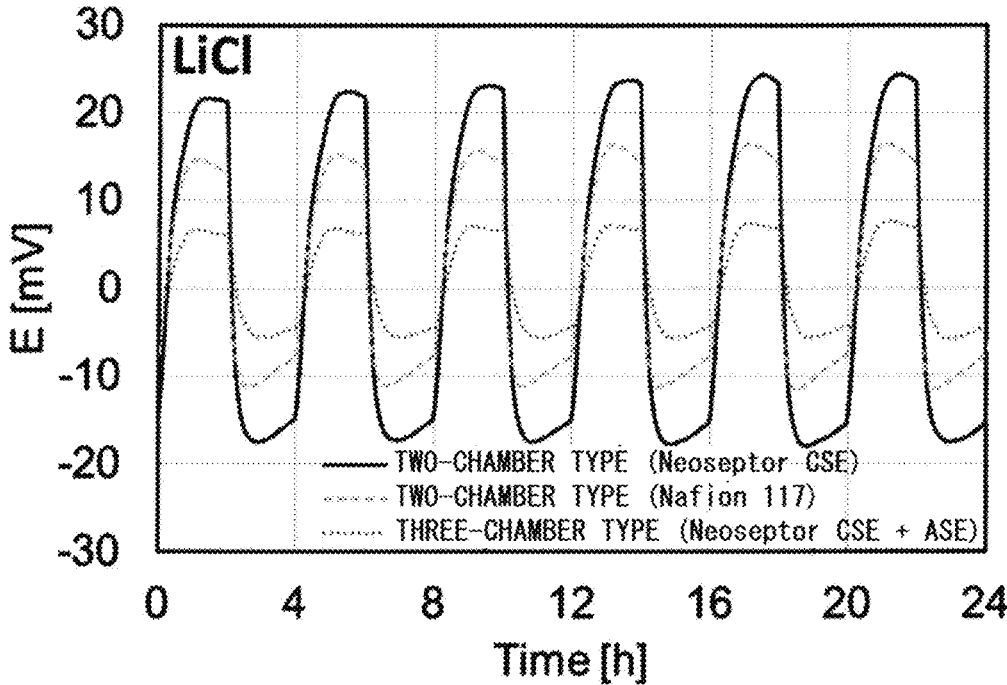
FIG. 7 is a graph of an open circuit voltage when a humidity change is applied to the power generating element according to the present invention.
Figure 8:
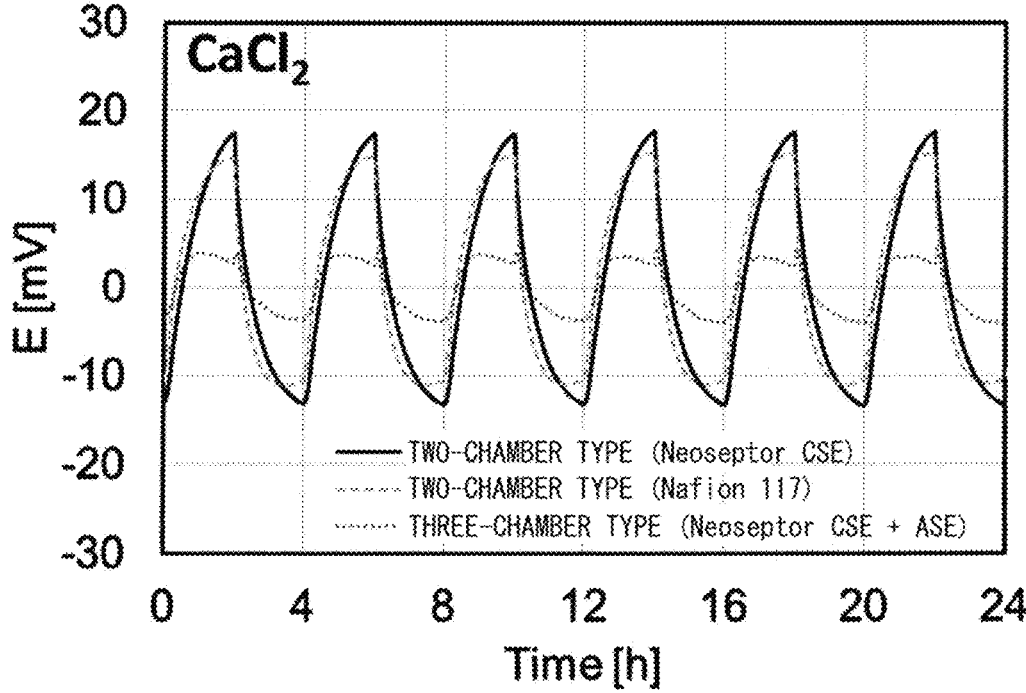
FIG. 8 is a graph of an open circuit voltage when a humidity change is applied to the power generating element according to the present invention.

FIGS. 7 and 8 show the results of measuring the open circuit voltage when a humidity change is applied to the obtained power generating element. The power generating element was placed in a thermo-hygrostat, maintained at 25° C., and subjected to a humidity change alternately repeating with a humidity of 30% and a humidity of 90% every 4 hours. As a result, it was possible to obtain the highest voltage in the two-chamber type using the lithium chloride aqueous solution and Neosepta CSE as the cation exchange membrane. The voltage was about 26 to 28 mV at a humidity of 30% and about −18 to −19 mV at a humidity of 90%. Even when the calcium chloride aqueous solution was used, the highest voltage could be obtained in the two-chamber type power generating element using Neosepta CSE.

Figure 9:
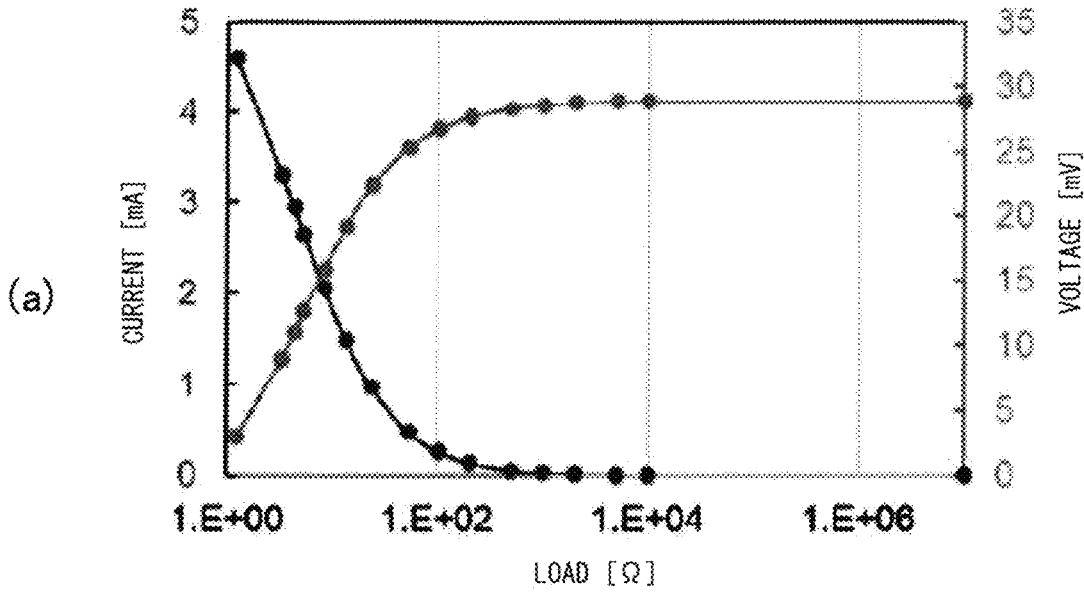
FIG. 9(*a*) is a graph of a voltage and a current when a load is connected to a power generating element, and FIG. 9(*b*) is a graph of an output calculated from the obtained voltage and current.
Figure 9:
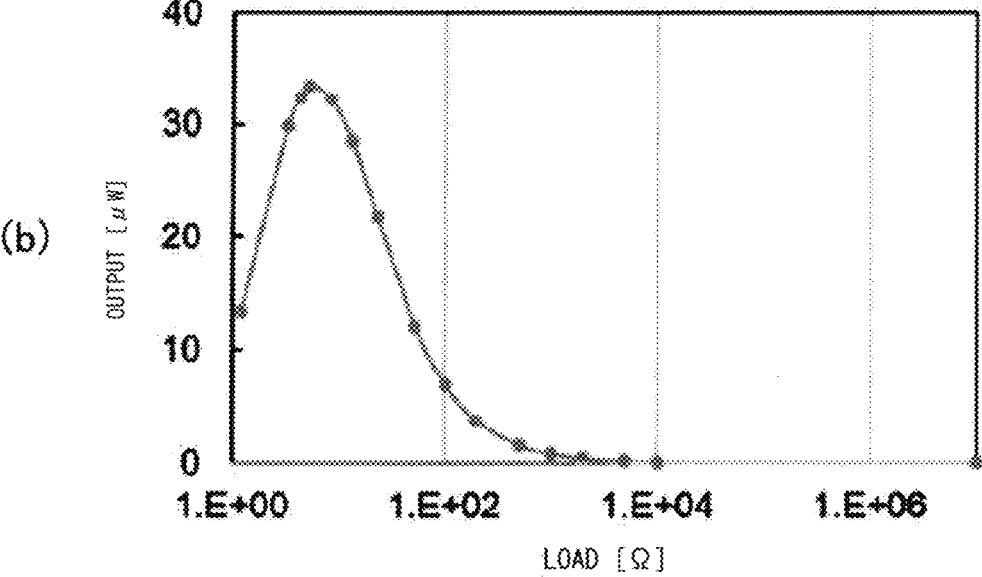

FIG. 9 illustrates a result of measuring an output by connecting a load when a voltage of 28 mV is obtained from a two-chamber type power generating element using a lithium chloride aqueous solution and Neosepta CSE. The short circuit current was 4.6 mA (FIG. 9(a)). In addition, according to the output calculated from the current and the voltage, the maximum value was obtained when the load was 5Ω and was 34 μW (FIG. 9(b)).

Figure 10:
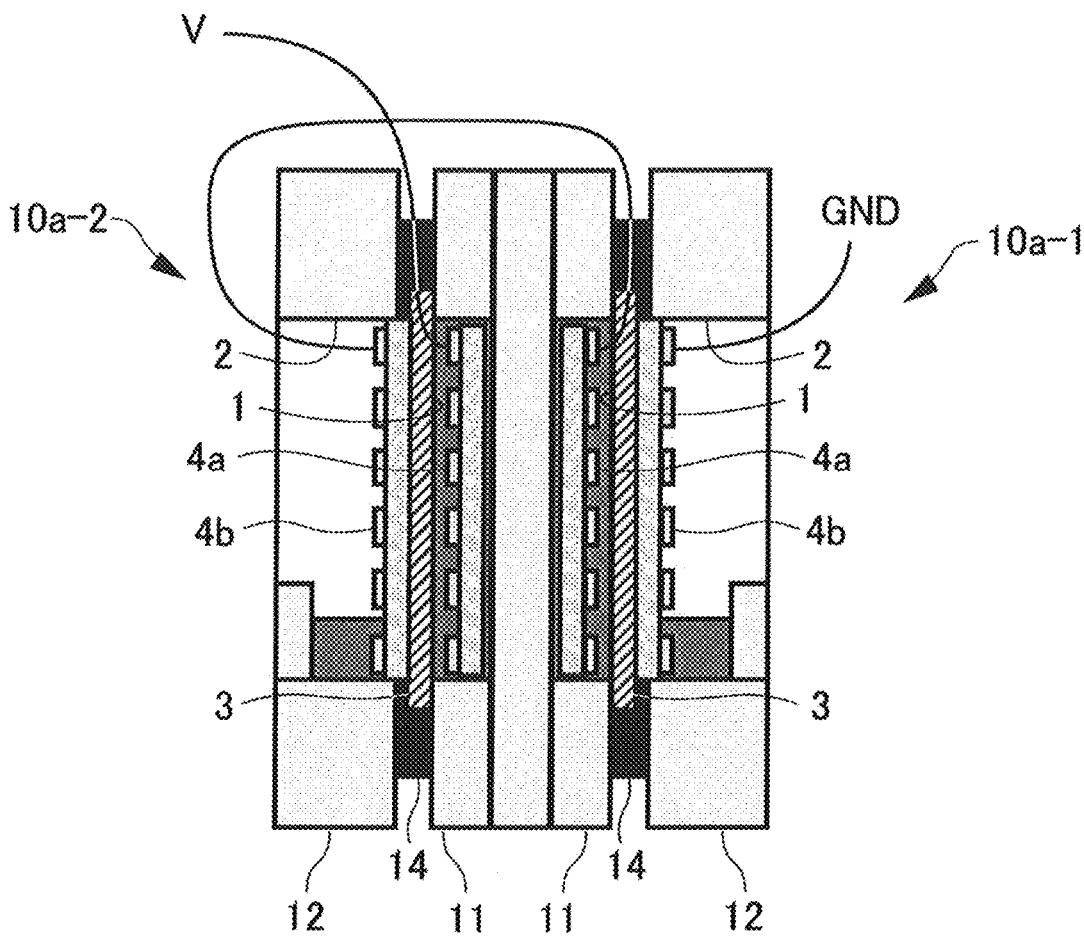
FIG. 10 is a cross-sectional view when two power generating elements according to the present invention are connected in series.

As illustrated in FIG. 10, two vertical power generating elements 10a were disposed back to back, and the power generating elements connected in series were produced. That is, the electrode 4b in the open tank 2 of the power generating element 10a-1 on one side (right side in the figure) is connected to ground, and the electrode 4a in the closed tank 1 is connected to the electrode 4b in the open tank 2 of the power generating element 10a-2 on the other side (left side in the figure). Then, wiring was performed so that the voltage of the electrode 4a in the closed tank 1 of the power generating element 10a-2 can be measured. A lithium chloride aqueous solution was used as the aqueous solution, and Neosepta CSE was used as the cation exchange membrane 3.

Figure 11:
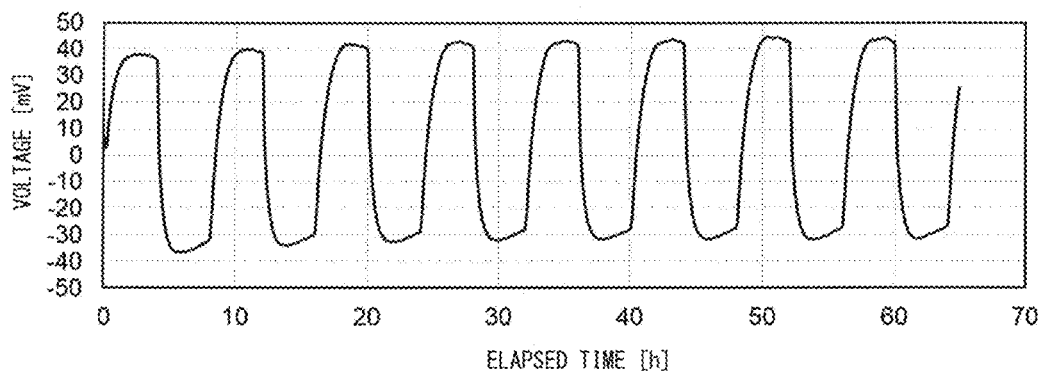
FIG. 11 is a graph of an open circuit voltage when a humidity change is applied to the power generating element according to the present invention.

FIG. 11 illustrates a result of measuring the open circuit voltage when a humidity change is applied to the obtained power generating element. The power generating element was placed in a thermo-hygrostat, maintained at 25° C., and subjected to a humidity change alternately repeating with a humidity of 30% and a humidity of 90% every 4 hours. As a result, it was confirmed that a voltage about twice the voltage obtained by one power generating element was obtained.

Although representative examples according to the present invention have been described above, it is not intended to be limited thereto, and those skilled in the art will be able to find various alternative examples and modifications without departing from the spirit of the present invention or the scope of the appended claims.

REFERENCE SIGNS LIST

1 Closed tank
2 Open tank
3 Ion permeable membrane
4a, 4b Electrode
9a, 9b Aqueous solution
10 Power generating element

The invention claimed is:

1. A power generation method for obtaining an electromotive force using humidity variation in an environment, comprising the steps of:
   separating an aqueous solution of an ionic compound having deliquescence by an ion permeable membrane and inserting electrodes into the aqueous solutions on both sides of the ion permeable membrane;
   blocking from outside air, and sealing, one of the aqueous solutions of the ionic compound containing the electrode, and connecting the other aqueous solution of the ionic compound containing the electrode to the outside air;

generating a difference in ion concentration derived from the ionic compound between the sealed aqueous solution of the ionic compound and the other aqueous solution of the ionic compound connected to the outside air with a change in humidity in the outside air; and generating an electromotive force between the electrodes in the aqueous solutions across the ion permeable membrane with the difference in ion concentration.

2. The power generation method according to claim 1, wherein the ion permeable membrane is a cation exchange membrane.

3. The power generation method according to claim 1, wherein the ionic compound is a halide, and the electrode is a silver-silver halide electrode.

4. The power generation method according to claim 3, wherein the halide is a halide of lithium.

5. The power generation method according to claim 1, wherein the aqueous solution is permeation-held in a porous body.

6. A power generating element for obtaining an electromotive force using humidity variation in an environment, comprising:

an ion permeable membrane that separates an aqueous solution of an ionic compound having deliquescence, and electrodes inserted into the aqueous solution on both sides of the ion permeable membrane, wherein one of the aqueous solutions separated by the ion permeable membrane is blocked from outside air and sealed, and the other is connected to the outside air, and a difference in ion concentration derived from the ionic compound in the aqueous solution is generated across the ion permeable membrane due to a change in humidity in the outside air to generate an electromotive force between the electrodes.

7. The power generating element according to claim 6, wherein the ion permeable membrane is a cation exchange membrane.

8. The power generating element according to claim 6, wherein the ionic compound is a halide, and the electrode is a silver-silver halide electrode.

9. The power generating element according to claim 8, wherein the halide is a halide of lithium.

10. The power generating element according to claim 7, wherein the aqueous solution is permeation-held in a porous body.

11. The power generating element according to claim 6, wherein an internal resistance is 10 ohms or less.

* * * * *